United States Patent
Chung et al.

(10) Patent No.: US 10,344,205 B2
(45) Date of Patent: Jul. 9, 2019

(54) SYSTEMS AND METHODS FOR BREAKING FRICTION REDUCERS IN-SITU

(71) Applicant: Halliburton Energy Services, Inc., Houston, TX (US)

(72) Inventors: HsinChen Chung, Houston, TX (US); Prashant Dinkar Chopade, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/763,411

(22) PCT Filed: Oct. 27, 2015

(86) PCT No.: PCT/US2015/057651
§ 371 (c)(1),
(2) Date: Mar. 26, 2018

(87) PCT Pub. No.: WO2017/074326
PCT Pub. Date: May 4, 2017

(65) Prior Publication Data
US 2018/0355240 A1 Dec. 13, 2018

(51) Int. Cl.
*C09K 8/70* (2006.01)
*E21B 37/06* (2006.01)
(Continued)

(52) U.S. Cl.
CPC .............. *C09K 8/706* (2013.01); *C09K 8/528* (2013.01); *C09K 8/602* (2013.01); *C09K 8/604* (2013.01);
(Continued)

(58) Field of Classification Search
None
See application file for complete search history.

(56) References Cited

U.S. PATENT DOCUMENTS 3,977,472 A * 8/1976 Graham ................... C09K 8/64
166/283
4,359,391 A * 11/1982 Salathiel .................. C09K 8/36
166/271
(Continued)

OTHER PUBLICATIONS

International Search Report and Written Opinion of PCT Application No. PCT/US2015/057651 dated Jul. 26, 2016: pp. 1-11.
(Continued)

*Primary Examiner* — Anuradha Ahuja
(74) *Attorney, Agent, or Firm* — Chamberlain Hrdlika

(57) ABSTRACT

A system and methods for breaking friction reducers in subterranean formations in-situ during hydraulic fracturing operations are disclosed. A method of fracturing a subterranean formation is disclosed, including providing a well treating fluid, adding a friction reducer into a water phase of an emulsion, adding a breaker into the water phase, and injecting the well treating fluid into the subterranean formation at a pressure sufficient to fracture the subterranean formation and invert the emulsion and double emulsion, thereby allowing the breaker to break the friction reducer. A friction reducer-breaker system for breaking a friction reducer polymer in-situ is also disclosed, including an oil phase, a water phase including friction reducer polymers and breakers in double emulsion dispersed throughout the water phase, wherein the emulsion and double emulsion are configured to invert under shear, thereby providing for mixing between the friction reducer polymers and the breakers.

20 Claims, 1 Drawing Sheet

(51) Int. Cl.

| | | |
|---|---|---|
| *E21B 43/26* | (2006.01) | |
| *C09K 8/528* | (2006.01) | |
| *C09K 8/60* | (2006.01) | |
| *C09K 8/68* | (2006.01) | |
| *C09K 8/74* | (2006.01) | |
| *C09K 8/88* | (2006.01) | |
| *E21B 41/02* | (2006.01) | |
| *E21B 43/267* | (2006.01) | |

(52) U.S. Cl.
CPC ............ *C09K 8/605* (2013.01); *C09K 8/68* (2013.01); *C09K 8/685* (2013.01); *C09K 8/74* (2013.01); *C09K 8/882* (2013.01); *C09K 8/887* (2013.01); *E21B 37/06* (2013.01); *E21B 41/02* (2013.01); *E21B 43/26* (2013.01); *C09K 2208/14* (2013.01); *C09K 2208/24* (2013.01); *C09K 2208/26* (2013.01); *C09K 2208/28* (2013.01); *C09K 2208/32* (2013.01); *E21B 43/267* (2013.01)

(56) References Cited

U.S. PATENT DOCUMENTS

| | | | | |
|---|---|---|---|---|
| 4,517,102 | A * | 5/1985 | Salathiel | C09K 8/607 507/238 |
| 6,284,714 | B1 * | 9/2001 | Bland | C09K 8/26 507/100 |
| 7,354,886 | B2 * | 4/2008 | Bland | C09K 8/035 507/116 |
| 7,504,366 | B2 | 3/2009 | Hanes, Jr. et al. | |
| 7,825,073 | B2 | 11/2010 | Welton et al. | |
| 2007/0284101 | A1 | 12/2007 | Valeriano et al. | |
| 2008/0194432 | A1 * | 8/2008 | Heidlas | C09K 8/12 507/219 |
| 2010/0314113 | A1 * | 12/2010 | Huang | C09K 8/516 166/300 |
| 2012/0181019 | A1 * | 7/2012 | Saini | B82Y 30/00 166/250.01 |
| 2012/0181029 | A1 * | 7/2012 | Saini | C04B 40/0633 166/307 |
| 2013/0137610 | A1 * | 5/2013 | Huang | C09K 8/516 507/218 |
| 2014/0051620 | A1 | 2/2014 | Soane et al. | |
| 2015/0105302 | A1 * | 4/2015 | Pursley | C09K 8/58 507/203 |
| 2016/0032170 | A1 * | 2/2016 | Li | C09K 8/588 166/305.1 |
| 2017/0362487 | A1 * | 12/2017 | Waterman | C09K 8/26 |
| 2018/0128088 | A1 * | 5/2018 | Pavlov | E21B 43/12 |

OTHER PUBLICATIONS

Lee et al., "Production of nanoparticles-in-microparticles by a double emulsion method: A comprehensive study," European Journal of Pharmaceutics and Biopharmaceutics, 2013, vol. 83: pp. 168-173.

* cited by examiner

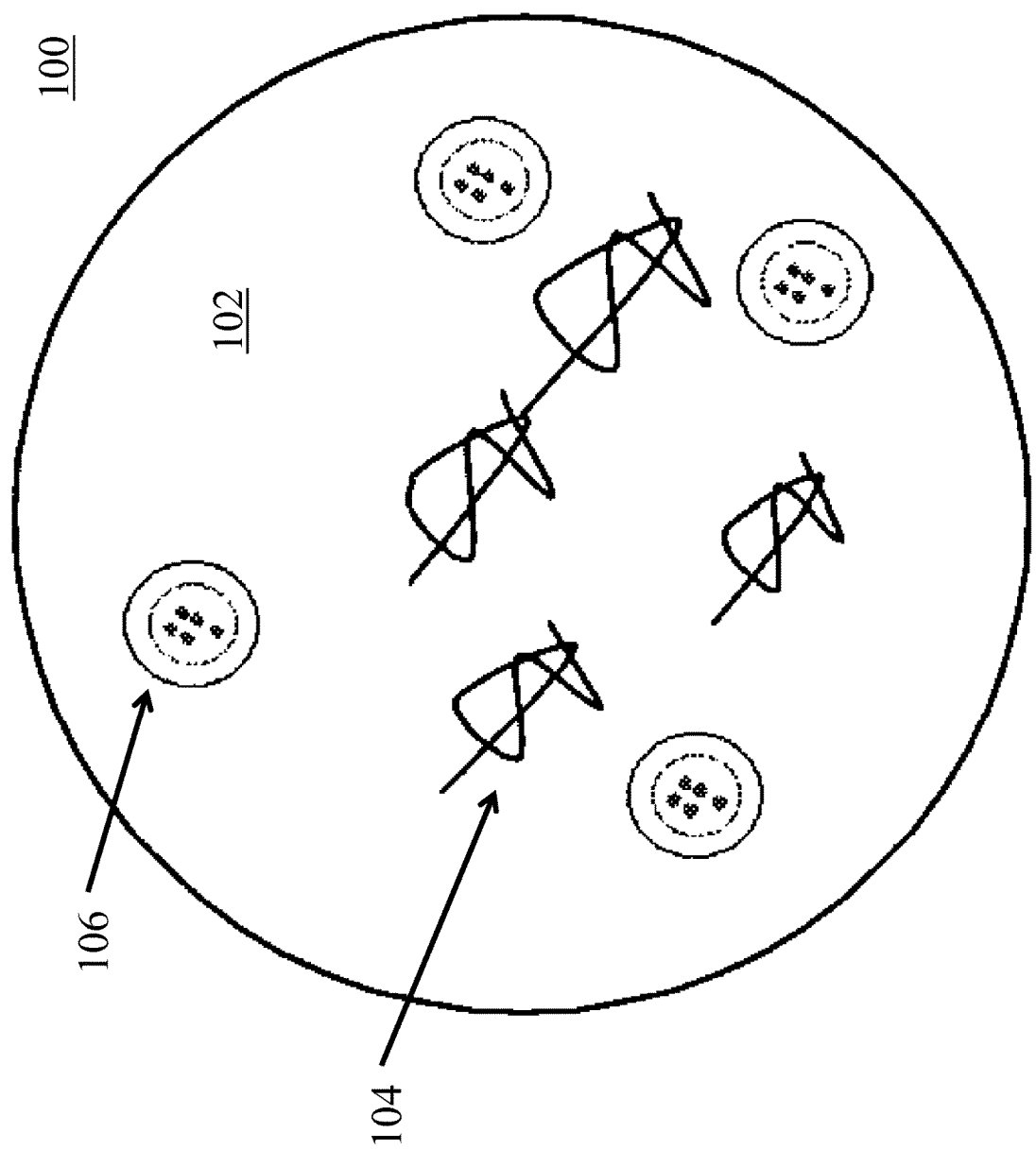

SYSTEMS AND METHODS FOR BREAKING FRICTION REDUCERS IN-SITU

BACKGROUND

This section is intended to introduce the reader to various aspects of art that may be related to various aspects of the presently described embodiments. This discussion is believed to be helpful in providing background information to facilitate a better understanding of the present embodiments. Accordingly, it should be understood that these statements are to be read in this light, and not as admissions of prior art.

The present disclosure generally relates to a system and methods for fracturing subterranean formations, and more specifically, to a system and methods for breaking friction reducers in subterranean formations in-situ during hydraulic fracturing operations.

It is common practice to treat a subterranean formation to increase the permeability or conductivity of the formation. These procedures are identified generally as fracturing operations. For example, it is a conventional practice to hydraulically fracture a well in order to produce one or more cracks or "fractures" in the surrounding formation by mechanical breakdown of the formation.

Hydraulic fracturing may be carried out in wells which are completed in subterranean formations for virtually any purpose. The usual candidates for hydraulic fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a fracturing fluid into the well and applying sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Typically, the primary component of a fracturing fluid is water. In addition to water, a fracturing fluid can contain one or more additives to facilitate formation fracturing.

Usually a gel, an emulsion, or a foam, having a proppant such as sand or other particulate material suspended therein, is carried in the fracturing fluid and introduced into the fracture. The proppant is deposited in the fracture and functions to hold the fracture open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows along the created fracture. Generally, a gelation agent and/or an emulsifier is used to gel or emulsify the fracturing fluid to provide the high viscosity needed to realize the maximum benefits from the fracturing process.

Practical and cost considerations for hydraulic fracturing operations require the use of additives to reduce the required pumping pressure. This can be accomplished by introducing additives that reduce the frictional drag of the fracturing fluid against the well tubulars, which serve as a conduit for the fluid into the formation. High-molecular weight, long-polymer chain polymers are widely used as friction reducing additives, or "friction reducers," to this end. Non-limiting examples of such polymers are polyacrylamide-based polymers. The long chain, high molecular weight polymers work by reducing the turbulent flow regime in the fracturing fluid into laminar flow. Laminar flow results in lower frictional drag and pressure buildup compared to turbulent flow. In this way, these polymers reduce turbulence and backpressure from friction within the well tubulars, thereby reducing pressure pump power demands.

Other, non-limiting, categories of fracturing fluid additives include biocides to prevent microorganism growth and to reduce biofouling of the fractures, corrosion inhibitors to prevent corrosion of metal pipes, scale inhibitors to prevent mineral scale formation as the fracturing fluid mixes with formation water or after dissolving existing mineral salts in the reservoir, acids to remove drilling mud damage within the near-wellbore area, crosslinking agents to increase fluid viscosity to deliver proppant into the formation, surfactants to reduce interfacial tension in the subterranean formation and to promote more robust water recovery after hydraulic fracturing, and the like. Any other additives well-known in the art and suitable for well treatment purposes are also envisioned.

When using friction reducers in hydraulic fracturing operations, the friction reducers tend to easily adsorb onto the subterranean formation. This can present a number of challenges. For instance, the friction reducer may actually plug some of the subterranean formation pore spaces, thereby decreasing formation conductivity. Further, the friction reducer may hinder recovery of the fluid used in the hydraulic fracturing operations. In addition, the friction reducer can provide a source of nitrogen that may support the growth of bacteria in the formation. Friction reducer that is not adsorbed, but that remains in solution in recovered water, will also make disposal of that water more difficult once the water is retrieved to the surface.

Accordingly, it is advantageous to break the friction reducer (e.g., by breaking the polymer backbone) so that the friction reducer can be substantially cleaned from the subterranean formation and returned to the surface. Compositions used in this process to interact with the friction reducer may be referred to in the art as "breakers."

Generally, breakers and friction reducers are pumped down the wellbore at the same trip. The most commonly used breakers for friction reducers are in solid form and the solid breakers need to be well dispersed in the fracturing fluid in order to breakdown the friction reducers completely. However, in most cases this is challenging due to the concentration gradient of the breakers and the requirement that the breakers must be uniformly distributed in the fracturing fluid. Adding breakers into the fracturing fluid is a "two-stream" process. Because more the one chemical is being added, another pipeline must be used in the process so that the two chemicals may be pumped and mixed well. The additional pipeline and mixing requires higher cost and a more complex operation.

Accordingly, a system and method for breaking friction reducers during hydraulic fracturing operations which reduces surface operation complexity and increases formation permeability and conductivity is desired.

BRIEF DESCRIPTION OF THE DRAWINGS

Illustrative embodiments of the present disclosure are described in detail below with reference to the attached drawing FIGURE, which is incorporated by reference herein and wherein:

FIG. 1 is a schematic illustration of a friction reducer-breaker double emulsion system.

The illustrated FIGURE is only exemplary and is not intended to assert or imply any limitation with regard to the environment, design, or process in which different embodiments may be implemented.

DETAILED DESCRIPTION OF ILLUSTRATIVE EMBODIMENTS

The following discussion is directed to various embodiments of the present disclosure. The drawing FIGURES are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function. The drawing FIGURE is not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." The use of "top," "bottom," "above," "below," and variations of these terms is made for convenience, but does not require any particular orientation of the elements.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

The system and methods of this disclosure provide means for breaking friction reducers used to decrease frictional losses occurring when pumping a treating fluid, such as a fracturing fluid, into a subterranean formation. The treating fluid may comprise water, either fresh water or water comprising salt. The disclosed systems and methods reduce surface complexity (e.g., reducing number of fluid streams which must be pumped down, decreasing footprint of equipment required at surface) and increase breaking efficiency, leading to increased formation permeability and conductivity.

Generally, a friction reducer-breaker system is disclosed in which the friction reducer can be broken in-situ in the formation by a breaker in a double emulsion. The friction reducer-breaker system can be dispersed throughout any aqueous fracturing fluid generally known in the art. Unlike traditional methods, the disclosed system provides a two-in-one friction reducer-breaker system to reduce operational complexity and enhance formation permeability and conductivity.

Referring now to FIG. 1, a schematic illustration of the disclosed friction reducer-breaker system is shown. As illustrated, the system includes a friction reducer polymer 104 in an emulsion comprising an oil phase 100 and a water phase 102. The oil phase 100 comprises the system wall and water phase 102 comprises the interior of the system. The friction reducer polymer 104 is distributed throughout the water phase of the emulsion. The friction reducer polymer can be a high-molecular weight, long chain polymer, such as anionic polyacrylamide-based polymers.

The breaker 106 can be introduced to the water phase 102 as nanoparticles in a double emulsion. The breaker 106 nanoparticles are introduced to the friction reducer emulsion prior to introduction into the subterranean formation. The breaker 106 can be an instant breaker or a delayed control breaker. Further, the breaker 106 can comprise enzymes, such as hemicellulase on an inert substrate, oxidizers such as sodium persulfate, sodium perborate, ammonium persulfate, sodium chlorite, and the like, organic acids or salts, such as citric acid or a citrate, fumaric acid, liquids adsorbed on a solid substrate, solid perborates, solid peroxides or other oxidizers, and/or mixtures of two or more materials and the like.

The breaker 106 nanoparticle double emulsion can be made using known techniques such as those, for example, disclosed in Lee, Yan-Sim, Johnson, Philip, Robbins, Philip, Bridson, Rachel, "Production of Nanoparticles-in-Microparticles by a Double Emulsion Method: A Comprehensive Study," *European Journal of Pharmaceutics and Biopharmaceutics*, 83 (2013): 168-173. For instance, a nanoparticle double emulsion can be prepared by adding an active breaker ingredient, such as those discussed above, to a solution comprising a polyester, such as polycaprolactone, in acetone. This solution comprises breaker loaded nanoparticles. The solution can then be emulsified in a polyvinylacetate solution. The solution can then be stirred to solidify the particles. After solidification, the particles can be collected by centrifugation and the supernatant decanted off. The nanoparticles can then be resuspended in polyvinylacetate solution to produce a slurry of wet nanoparticles. The slurry can then be homogenized in polyvinyl acetate solution and then homogenized in poly(lactic-co-glycolic acid) dissolved in a solvent. The primary emulsion can then be added to the polyvinylacetate solution to form the double emulsion. The double emulsion can then be added to a friction reduce solution to form a friction reducer-breaker emulsion system according to the present disclosure. Other techniques for preparing nanoparticle-in-microparticle ("NIM") systems are also envisioned.

In practice, the friction reducer may be present in an amount of from about 0.25 to in excess of 10 gallons per 1000 gallons of fracturing fluid. The breaker may be present in an amount of from about 0.1 to in excess of 10 pounds per 1000 gallons of fracturing fluid. The precise concentrations of the friction reducers and breakers will vary from well to well, and will depend upon a number of factors including formation properties such as temperature and pressure.

The breaker 106 is a double emulsion and will not come into contact with the friction reducer polymer 104 until the emulsion is inverted. This ensures the stability of the system. In practice, the emulsions are inverted in response to shear. Shear capable of inverting the emulsions is achieved during pumping of the fracturing fluid downhole via a pump, such as any pump known to those of ordinary skill in the art, providing for the friction reducer polymers 104 and breaker 106 to be released from the emulsions and mix homogenously.

To further illustrate the present disclosure, and not by way of limitation, the following Examples are presented:

The treatment fluids of the present disclosure may be used in a variety of subterranean treatments for which treatment fluids are suitable. Examples of such treatments include, but are not limited to, drilling, completion, and fracturing operations. The treatment fluid of the present disclosure may be useful as a treatment fluid in any treatment operation that requires a friction reducer.

In addition to the embodiments described above, many examples of specific combinations are within the scope of the disclosure, some of which are detailed below:

Example 1

A method of breaking a friction reducer polymer comprising: providing a friction reducer-breaker system comprising the friction reducer polymer in a water phase of an emulsion and a breaker in a double emulsion within the water phase; pumping the friction reducer-breaker system under pressure via a pump into a wellbore penetrating a subterranean formation; and inverting the emulsion and double emulsion so that the breaker interacts with the friction reducer polymer to break the friction reducer polymer.

Example 2

The method of Example 1, further comprising pumping the broken friction reducer polymer out of the wellbore.

Example 3

The method of claim 1, wherein the friction reducer polymer is a polyacrylamide-based polymer.

Example 4

The method of claim 1, wherein the breaker is at least one of an instant breaker and a delayed breaker.

Example 5

The method of claim 1, wherein the breaker is at least one of an oxidizer, an acid, and an enzyme.

Example 6

A method of fracturing a subterranean formation comprising: providing a well treating fluid comprising water; adding a friction reducer in a water phase of an emulsion to the treating fluid; adding a breaker in a double emulsion into the water phase; and injecting the well treating fluid into the subterranean formation at a pressure sufficient to fracture the subterranean formation and invert the double emulsion, thereby allowing the breaker to break the friction reducer.

Example 7

The method of claim 6, wherein the friction reducer is added in an amount from about 0.25 to about 10 gal/1000 gal of water.

Example 8

The method of claim 6, wherein the breaker is added in an amount from about 0.1 to about 10 lb/1000 gal of water.

Example 9

The method of claim 6, wherein the friction reducer polymer is a polyacrylamide-based polymer.

Example 10

The method of claim 6, wherein the breaker is at least one of an instant breaker and a delayed breaker.

Example 11

The method of claim 6, wherein the breaker is at least one of an oxidizer, an acid, and an enzyme.

Example 12

The method of claim 6, wherein the water is fresh water.

Example 13

The method of claim 6, wherein the water is salt water.

Example 14

The method of claim 6 further comprising adding to the well treating fluid other additives selected from the group consisting of biocides, corrosion inhibitors, scale inhibitors, acids, crosslinking agents, surfactants, and mixtures thereof.

Example 15

A friction reducer-breaker system for breaking a friction reducer polymer in-situ in a subterranean formation including an emulsion, comprising: an oil phase; a water phase including friction reducer polymers and breakers in double emulsion dispersed throughout the water phase, wherein, the emulsion and double emulsion are configured to invert under shear, thereby providing for mixing between the friction reducer polymers and the breakers.

Example 16

The system of claim 15, wherein shear is achieved by pumping the friction reducer-breaker system under pressure via a pump into a wellbore penetrating a subterranean formation.

Example 17

The system of claim 15, wherein the friction reducer polymer is a polyacrylamide-based polymer.

Example 18

The system of claim 15, wherein the breaker is at least one of an instant breaker and a delayed breaker.

Example 19

The system of claim 15, wherein the breaker is at least one of an oxidizer, an acid, and an enzyme.

Example 20

The system of claim 15, wherein the breaker is at least one of an hemicellulase enzyme, sodium persulfate, sodium perborate, ammonium persulfate, sodium chlorite, citric acid, citrate, fumaric acid, perborates, peroxides, or any mixture thereof.

While the aspects of the present disclosure may be susceptible to various modifications and alternative forms, specific embodiments have been shown by way of example in the drawings and have been described in detail herein. But it should be understood that the disclosure is not intended to be limited to the particular forms disclosed. Rather, the disclosure is to cover all modifications, equivalents, and alternatives falling within the spirit and scope of the disclosure as defined by the following appended claims.

We claim:

1. A method of breaking a friction reducer polymer comprising:
    providing a treatment fluid comprising an aqueous base fluid and a friction reducer-breaker system, wherein the friction-reducer breaker system comprises an emulsion comprising:
        (a) a first oil phase,
        (b) a first water phase within the first oil phase,
        (c) a second oil phase within the first water phase, and
        (d) a second water phase within the second oil phase, wherein the friction reducer polymer is in the first water phase and a breaker is in the second water phase; and
    pumping the treatment fluid under pressure via a pump into a wellbore to increase shear above a threshold value to invert the emulsion so that the breaker interacts with the friction reducer polymer to break the friction reducer polymer.

2. The method of claim 1, further comprising pumping the broken friction reducer polymer out of the wellbore.

3. The method of claim 1, wherein the friction reducer polymer comprises a polyacrylamide-based polymer.

4. The method of claim 1, wherein the breaker comprises at least one of an instant breaker and a delayed breaker.

5. The method of claim 1, wherein the breaker comprises at least one of an oxidizer, an acid, and an enzyme.

6. A method of fracturing a subterranean formation comprising:
    providing a well treating fluid comprising water and a friction reducer-breaker system, wherein the friction-reducer breaker system comprises an emulsion comprising:
        (a) a first oil phase in the water,
        (b) a first water phase within the first oil phase,
        (c) a second oil phase within the first water phase, and
        (d) a second water phase within the second oil phase;
    adding a friction reducer in the first water phase;
    adding a breaker in the second water phase; and
    injecting the well treating fluid into the subterranean formation at a pressure sufficient to fracture the subterranean formation and to produce a shear force above a threshold value to invert the emulsion, thereby allowing the breaker to break the friction reducer.

7. The method of claim 6, wherein adding the friction reducer further comprises adding the friction reducer in an amount from about 0.25 to about 10 gal/1000 gal of water.

8. The method of claim 6, wherein the breaker is added in an amount from about 0.1 to about 10 lb/1000 gal of water.

9. The method of claim 6, wherein the friction reducer polymer comprises a polyacrylamide-based polymer.

10. The method of claim 6, wherein the breaker comprises at least one of an instant breaker and a delayed breaker.

11. The method of claim 6, wherein the breaker comprises at least one of an oxidizer, an acid, and an enzyme.

12. The method of claim 6, wherein the water is fresh water.

13. The method of claim 6, wherein the water comprises salt in a concentration of at least 0.01 gal per 1000 gallons of the water.

14. The method of claim 6 further comprising adding to the well treating fluid at least one or mixtures of a biocide, a corrosion inhibitor, a scale inhibitor, an acid, a crosslinking agent, and a surfactant.

15. A friction reducer-breaker system for breaking a friction reducer polymer in-situ in a subterranean formation including an emulsion within an aqueous phase base fluid, the emulsion comprising:
    a first oil phase within the aqueous phase base fluid;
    a first water phase within the first oil phase and including friction reducer polymers;
    a second oil phase within the first water phase;
    a second water phase within the second oil phase as a double emulsion and including breakers; and
    wherein the emulsion and double emulsion are configured to invert under a threshold amount of shear, thereby providing for mixing between the friction reducer polymers and the breakers.

16. The system of claim 15, wherein the shear is achievable by pumping the friction reducer-breaker system under pressure via a pump into a wellbore penetrating a subterranean formation.

17. The system of claim 15, wherein the friction reducer polymers comprise a polyacrylamide-based polymer.

18. The system of claim 15, wherein the breakers comprise at least one of an instant breaker and a delayed breaker.

19. The system of claim 15, wherein the breakers comprise at least one of an oxidizer, an acid, and an enzyme.

20. The system of claim 15, wherein the breakers comprise at least one of an hemicellulase enzyme, sodium persulfate, sodium perborate, ammonium persulfate, sodium chlorite, citric acid, citrate, fumaric acid, perborates, peroxides, or any mixture thereof.

* * * * *